(12) United States Patent
Hirai (10) Patent No.: US 6,970,646 B2
(45) Date of Patent: Nov. 29, 2005

(54) FOCUS CONTROL APPARATUS, IMAGE SENSOR, PROGRAM AND STORAGE MEDIUM

(75) Inventor: Shinya Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 10/661,210

(22) Filed: Sep. 12, 2003

(65) Prior Publication Data

US 2004/0051029 A1 Mar. 18, 2004

(30) Foreign Application Priority Data

Sep. 13, 2002 (JP) ........................................ 2002-267774

(51) Int. Cl.⁷ .............................................. G03B 13/36
(52) U.S. Cl. ........................ 396/91; 396/102; 396/116; 396/133
(58) Field of Search .............................. 396/89, 91, 93, 396/102–104, 116, 133; 348/345, 347, 349, 353–356

(56) References Cited

U.S. PATENT DOCUMENTS 4,575,212 A * 3/1986 Kitaura et al. .............. 396/102
6,130,417 A * 10/2000 Hashimoto ................ 250/201.2
6,704,054 B1 * 3/2004 Hashimoto .................. 348/354
2003/0081137 A1 * 5/2003 Yamazaki .................... 348/354

FOREIGN PATENT DOCUMENTS

JP          3-68280       3/1991    .......... H04N/5/232

* cited by examiner

Primary Examiner—W. B. Perkey
(74) Attorney, Agent, or Firm—Morgan & Finnegan, LLP (57) ABSTRACT

A digital camera has distance measurement zone setting means (12) for dividing distance to a subject into a plurality of distance measurement zones; distance measurement zone selection means (13) for selecting a distance measurement zone to be scanned; an autofocus evaluation value calculation circuit (14) for acquiring an AF evaluation value by scanning the selected distance measurement zone; zone-update determination means (15) for determining, through use of the AF evaluation value, whether or not to update a distance measurement zone to be scanned; and in-focus position decision means (16) for appropriately updating the scanned distance measurement zone based upon the determination as to whether to update the distance measurement zone, and deciding an in-focus position based upon acquisition of AF evaluation value. A focusing lens (2) is driven to the in-focus position by a focusing-lens drive circuit (17).

25 Claims, 10 Drawing Sheets

| FOCAL LENGTH | NUMBER OF DIVISIONS |
|---|---|
| Wide | 1 |
| tele | 3 |

FIG. 9A

ZONE DIVISION AT F5.6

FIG. 9B

ZONE DIVISION AT F4

FIG. 10

FOCUS CONTROL APPARATUS, IMAGE SENSOR, PROGRAM AND STORAGE MEDIUM

FIELD OF THE INVENTION

This invention relates to a focus control apparatus capable of shortening distance measurement time by dividing subject distance into a plurality of distance measurement zones and scanning each of the distance measurement zones in succession, as well as to an image sensor having this apparatus, a program applicable to this apparatus and a storage medium on which the program has been stored.

BACKGROUND OF THE INVENTION

Image sensors in digital cameras and the like often adopt an autofocus ("AF" below) method referred to as the TV-AF method. This method moves the focus position within a certain range and calculates distance to the subject using an AF evaluation signal at each of a number of points within this range (e.g., see the specification of Japanese Patent Application Laid-Open No. 3-68280). The AF evaluation signal is computed by extracting a signal component of a prescribed band using a BPF (bandpass filter), etc. The more the subject is in focus, the greater the signal computed.

Figure 10:
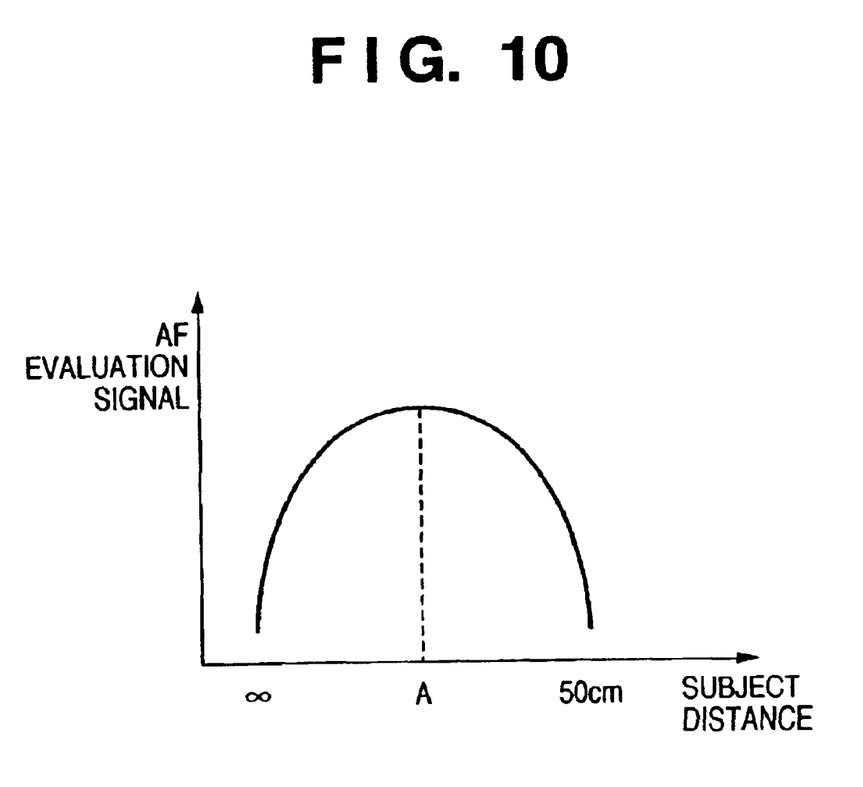
FIG. 10 is a diagram illustrating an example of a relationship between subject distance and AF evaluation value.

For example, if the distance from infinity to 50. cm is adopted as the range of distance measurement, as shown in FIG. 10, an AF evaluation signal at a focus position for focusing on infinity is acquired and then AF evaluation signals at each of a number of distances are acquired successively while making the focus position approach to a distance of 50 cm. AF control is subsequently carried out through a method of comparing the AF evaluation signals acquired at each of the distances and taking the focus position to be at a subject distance A judged to provide the best focus. (The subject distance A corresponds to the peak of the AF evaluation signal.)

It is usually difficult to acquire AF evaluation signals continuously while assigning focus positions. In many cases, therefore, AF evaluation signals are acquired upon downsampling AF evaluation signals at intervals of distances equivalent to depth of field.

However, in the case of a digital camera having a long focal length and a broad range of focus movement or a digital camera having a shallow depth of field and requiring fine movement of focus, the prior art is such that it is necessary to increase greatly the number of data samples (AF evaluation signals) acquired with regard to the range of distance measurement. As a consequence, acquiring the data takes time and, hence, the time needed for AF control is prolonged.

SUMMARY OF THE INVENTION

Accordingly, an object of the present invention is to provide a focus control apparatus that makes it possible to shorten autofocus time by raising autofocus speed without lowering autofocus precision even in a case where a large number of samples of autofocus evaluation signals are required with respect to range of distance measurement, as well as an image sensor having this apparatus, a program applicable to this apparatus and a storage medium on which the program has been stored.

According to the present invention, the foregoing object is attained by providing a focus control apparatus for detecting in-focus position of a focusing optical system by performing scanning for driving the focusing optical system in accordance with a prescribed range of a subject distance, comprising: zone dividing means for dividing the subject distance into a plurality of distance measurement zones; zone selection means for selecting a distance measurement zone to be scanned; in-focus state acquisition means for acquiring the in-focus state of the focusing optical system by scanning the selected distance measurement zone; zone-update determination means for determining, through use of the in-focus state, whether or not to update a distance measurement zone to be scanned; and in-focus position decision means for deciding an in-focus position of the focusing optical system based upon updating of the distance measurement zone to be scanned, which is based upon the update determination, and the acquisition of the in-focus state.

Further, according to the present invention, the foregoing object is attained by providing a focus control apparatus for detecting in-focus position of a focusing optical system by performing scanning for driving the focusing optical system in accordance with a prescribed range of a subject distance, comprising: zone dividing means for dividing the subject distance into a plurality of distance measurement zones; zone selection means for selecting a distance measurement zone to be scanned; in-focus state acquisition means for acquiring the in-focus state of the focusing optical system by scanning the selected distance measurement zone; in-focus discrimination means for discriminating whether or not focus has been achieved using the in-focus state; zone updating means for successively updating the distance measurement zone to be scanned; and update-execution determination means for determining whether or not to execute updating of the distance measurement zone in dependence upon result of in-focus discrimination.

Thus, in accordance with the present invention, as described above, subject distance is divided into a plurality of distance measurement zones and a distance measurement zone to be scanned is selected. The in-focus state of the focusing optical system is acquired by scanning the selected distance measurement zone and whether the distance measurement zone to be scanned is to be updated or not is determined using the distance-measurement information. The distance measurement zone scanned is updated appropriately and the in-focus position is decided based upon the acquisition of the in-focus state. In cases where the subject is found quickly, therefore, it is no longer necessary to scan other distance measurement zones. As a result, it is possible to realize a focus control apparatus and an image sensor having this apparatus in which autofocus time is shortened by raising autofocus speed without lowering autofocus precision even in a case where there are a large number of samples of the in-focus state required with respect to the range of distance measurement.

Further, in accordance with the present invention, subject distance is divided into a plurality of distance measurement zones and a distance measurement zone to be scanned is selected. The in-focus state of the focusing optical system is acquired by scanning the selected distance measurement zone and whether focus has been achieved is discriminated using the in-focus state. The distance measurement zone to be scanned is updated successively. Whether updating of the distance measurement zone is to be executed or not is determined in dependence upon the result of the in-focus discrimination. In cases where the subject is found quickly, therefore, it is no longer necessary to scan other distance measurement zones. As a result, as set forth above, it is possible to realize a focus control apparatus and an image sensor having this apparatus in which autofocus time is shortened.

Further, by changing a requirement for determining updating of the distance measurement zone and the requirement for in-focus discrimination in dependence upon the history of updating of the distance measurement zone, it is possible to carry out more suitable determination of updating of the distance measurement zone and discrimination of the in-focus state.

Even if there are a plurality of distance-measurement positions, division is made into a plurality of distance measurement zones, the in-focus state of the focusing optical system is acquired by scanning a selected distance measurement zone and scanning can be halted when it is judged that the in-focus state has been obtained based upon the in-focus state. This makes it possible to shorten autofocus time by raising autofocus speed, as set forth above.

Further, by changing the order in which distance measurement zones are updated in accordance with photographic conditions or mode of photography and changing the number of distance measurement zones into which the subject distance is divided in accordance with focal length or f-stop at the time of photography, it is possible to shorten autofocus time by raising autofocus speed, as set forth above.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 9A and 9B are diagrams illustrating relationships between F-number and number of divisions of distance measurement zones, in which FIG. 9A illustrates an example of division into distance measurement zones when the F-number is 5.6 and FIG. 9B an example of division into distance measurement zones when the F-number is 4.0.

DETAILED DESCRIPTION OF THE PREFERRED EMBODIMENTS

An overview of a mode of the present invention will be described first. According to this mode of practicing the invention, which relates to an image sensor such as that of a digital camera having an autofocus function, subject distance is divided into a plurality of distance measurement zones and a distance measurement zone to be scanned is selected from the plurality of distance measurement zones. (Scanning refers to an operation for driving a focusing optical system in accordance with a prescribed range of subject distance.) An AF evaluation value is acquired by scanning the selected distance measurement zone, the distance measurement zone to be scanned is updated appropriately based upon the update determination and the in-focus position is decided based upon the AF evaluation value. This shortens the AF time by raising the AF speed.

Embodiments of the present invention will be described in detail below with reference to the drawings.

[First Embodiment]

A first embodiment of the present invention will be described for a case where the autofocus apparatus of the invention is applied to a digital camera.

Figure 1:
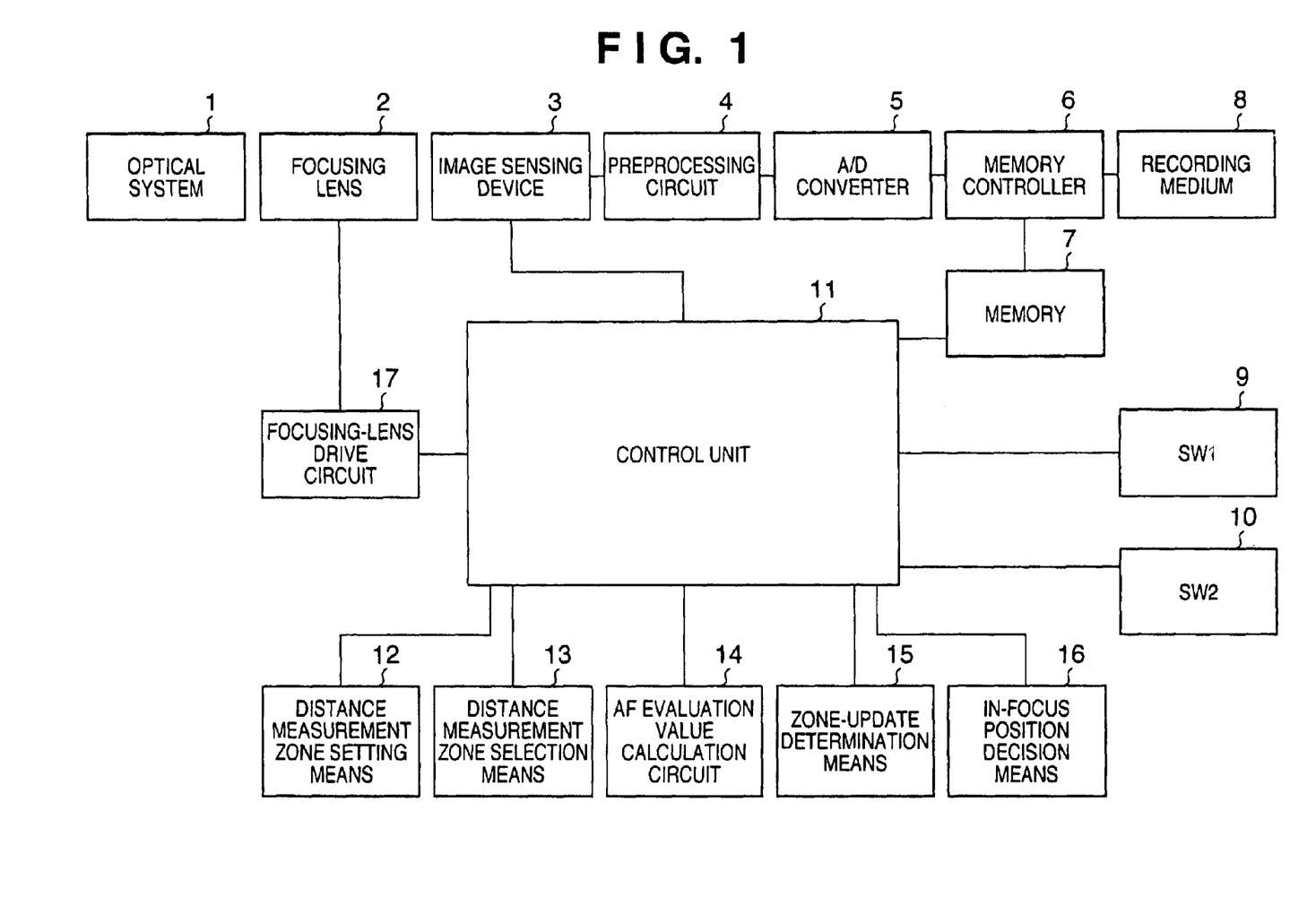
FIG. 1 is a block diagram illustrating the structure of a digital camera equipped with an autofocus apparatus according to a first embodiment of the present invention.

FIG. 1 is a block diagram illustrating the structure of a digital camera equipped with an autofocus apparatus according to a first embodiment of the present invention. The digital camera has an optical system 1, a focusing lens 2, an image sensing device 3, a preprocessing circuit 4, an A/D converter 5, a memory controller 6, a memory 7, a recording medium 8, a switch (SW1) 9, a switch (SW2) 10, a control unit 11, distance measurement zone setting means 12, distance measurement zone selection means 13, an AF evaluation value calculation circuit 14, zone-update determination means 15, in-focus position decision means 16 and a focusing-lens drive circuit 17.

The optical system 1 causes the image of a subject to impinge upon the image sensing device 3 via the focusing lens 2, which is driven over a selected range of distance measurement. The image sensing device 3 opto-electronically converts the image of the subject to an electric signal. The preprocessing circuit 4 has a CDS circuit for eliminating output noise and a non-linear amplifying circuit for applying non-linear amplification before an A/D conversion is performed. The A/D converter 5 converts an analog signal, which is output from the preprocessing circuit 4, to a digital signal. The memory controller 6 stores the digital signal, which is output from the A/D converter 5, in the memory 7. The recording medium 8 records images. The switch (SW1) 9 is pressed when the focusing lens 2 is to be driven, and the switch (SW2) 10 is pressed when a picture is to be taken.

The control unit 11 controls each component of the digital camera to thereby control various operations, which include an AF operation. The control unit 11 executes processing, which is represented by flowcharts described later, based upon a program stored within the digital camera or a program supplied externally. The distance measurement zone setting means 12 divides the subject distance into a plurality of distance measurement zones. The AF evaluation value calculation circuit 14 calculates an AF evaluation value by extracting mid- and high-frequency components of the signal acquired by the image sensing device 3. The zone-update determination means 15 determines whether or not to update a distance measurement zone based upon the AF evaluation value. The in-focus position decision means 16 decides the in-focus position based upon repetitive updating of the distance measurement zone and acquisition of the AF evaluation value. The focusing-lens drive circuit 17 drives the focusing lens 2 to the in-focus position.

The digital camera according to the first embodiment is such that light (the image of the subject) whose image has been formed on the image sensing device 3 by the optical system 1 and focusing lens 2 at the time of photography is opto-electronically converted by the image sensing device 3, and the resulting signal is converted to a digital signal through the preprocessing circuit 4, which has the CDS circuit that eliminates output noise and the non-linear amplifying circuit that applies non-linear amplification prior to the A/D conversion, and the A/D converter 5. The digital signal is stored in the memory 7 via the memory controller 6, and the digital signal that has been stored in the memory 7 is converted to an image by a signal processing circuit (not shown), after which the image is recorded on the recording medium 8.

The operation of the digital camera in the first embodiment constructed as set forth above will be described in detail while referring to FIGS. 1 to 5.

The AF operation will now be described. The AF operation is controlled by the control unit 11. First, if the switch (SW1) 9 is pressed by the photographer, the subject distance is divided into a plurality of distance measurement zones by the distance measurement zone setting means 12, the focusing lens 2 is driven by the focusing-lens drive circuit 17 so as to scan a distance-measurement range (distance measurement zone) that has been selected by the distance measurement zone selection means 13, and a signal is acquired by the image sensing device 3. The signal that has been acquired by the image sensing device 3 is applied to the AF evaluation value calculation circuit 14, which extracts mid-to-high frequency components using a BPF, whereby the signal is converted to an AF evaluation value (the value of the AF evaluation signal) at each scanned point.

Whether or not to perform distance measurement in another distance measurement zone is determined by the zone-update determination means 15 based upon the AF evaluation value at each scanned point. After the updating of the distance measurement zone by the zone-update determination means 15 and the acquisition of the AF evaluation value by the AF evaluation value calculation circuit 14 have been repeated, the in-focus position is decided by the in-focus position decision means 16 based upon the AF evaluation value that prevails following the end of the scan and the focusing lens 2 is driven to this in-focus position by the focusing-lens drive circuit 17. Picture-taking is executed in response to the switch (SW2) 10 being pressed by the photographer under these conditions.

The AF operation will now be described in greater detail.

Figure 2:
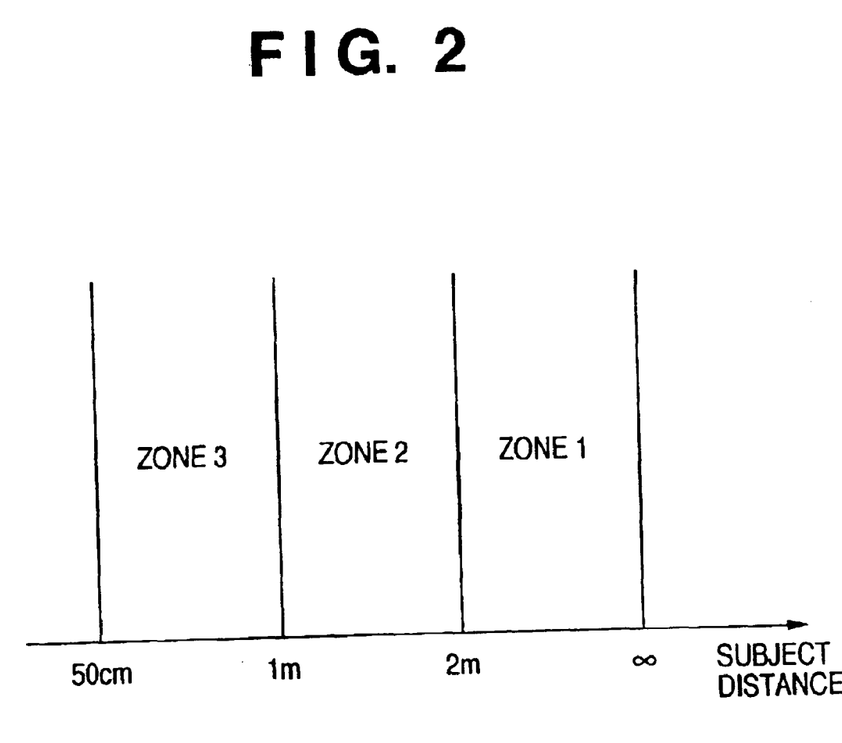
FIG. 2 is a diagram illustrating an example in which a distance measurement zone has been divided into a plurality of zones in dependence upon subject distance.

The first embodiment will be described on the assumption that the lens is a fixed focal length lens and that there is a single AF frame (distance-measurement position), which is an area displayed on the display screen of the digital camera. Further, it is assumed that the range of distance measurement is from infinity to, e.g., 50 cm. The distance measurement zone is divided into, e.g., three portions, as shown in FIG. 2, by the distance measurement zone setting means 12. FIG. 2 is a diagram illustrating the relationship between subject distance and distance measurement zones. This is an example in which distance measurement zones 1, 2 and 3 are assumed to be 2 m to infinity, 1 m to 2 m and 50 cm to 1 m, respectively. The method of dividing the object distance into distance measurement zones may be decided at will depending upon distance measuring speed, which subject distance is to be given priority, or the photographic conditions. Further, the number of distance measurement zones into which division is made can be changed in dependence upon focal length at the time of photography and the f-stop at the time of photography. In this case, the longer the focal length, the larger the number of distance measurement zones may be made, and the greater the aperture is stopped down, the smaller the number of distance measurement zones may be made.

Next, the order of the distance measurement zones scanned is decided by the distance measurement zone selection means 13. In this example, the order is assumed to be, e.g., distance measurement zone 1→distance measurement zone 2→distance measurement zone 3. In this case, this means that scanning is performed from where the subject distance is far away, as illustrated in FIG. 2. Besides the above, scanning may be performed from where the subject distance is nearby, as in the manner distance measurement zone 3→distance measurement zone 2→distance measurement zone 1, or scanning may be performed in the manner distance measurement zone 2→distance measurement zone 1→distance measurement zone 3. The purpose of dividing object distance into the distance measurement zones is to shorten AF time by finding the subject quickly and then halting scanning at this point. This means that it is desirable to perform scanning from a distance measurement zone in which there is a high probability that the subject will be present.

Accordingly, the order of the distance measurement zones scanned can be changed depending upon the mode of photography as follows: It may be so arranged that scanning is performed from far to near in a case where a picture is taken in a scene photography mode and from near to far in a case where a picture is taken in a portrait photography mode. This will make it possible to achieve focus more quickly on the subject intended by the photographer.

Figure 3:
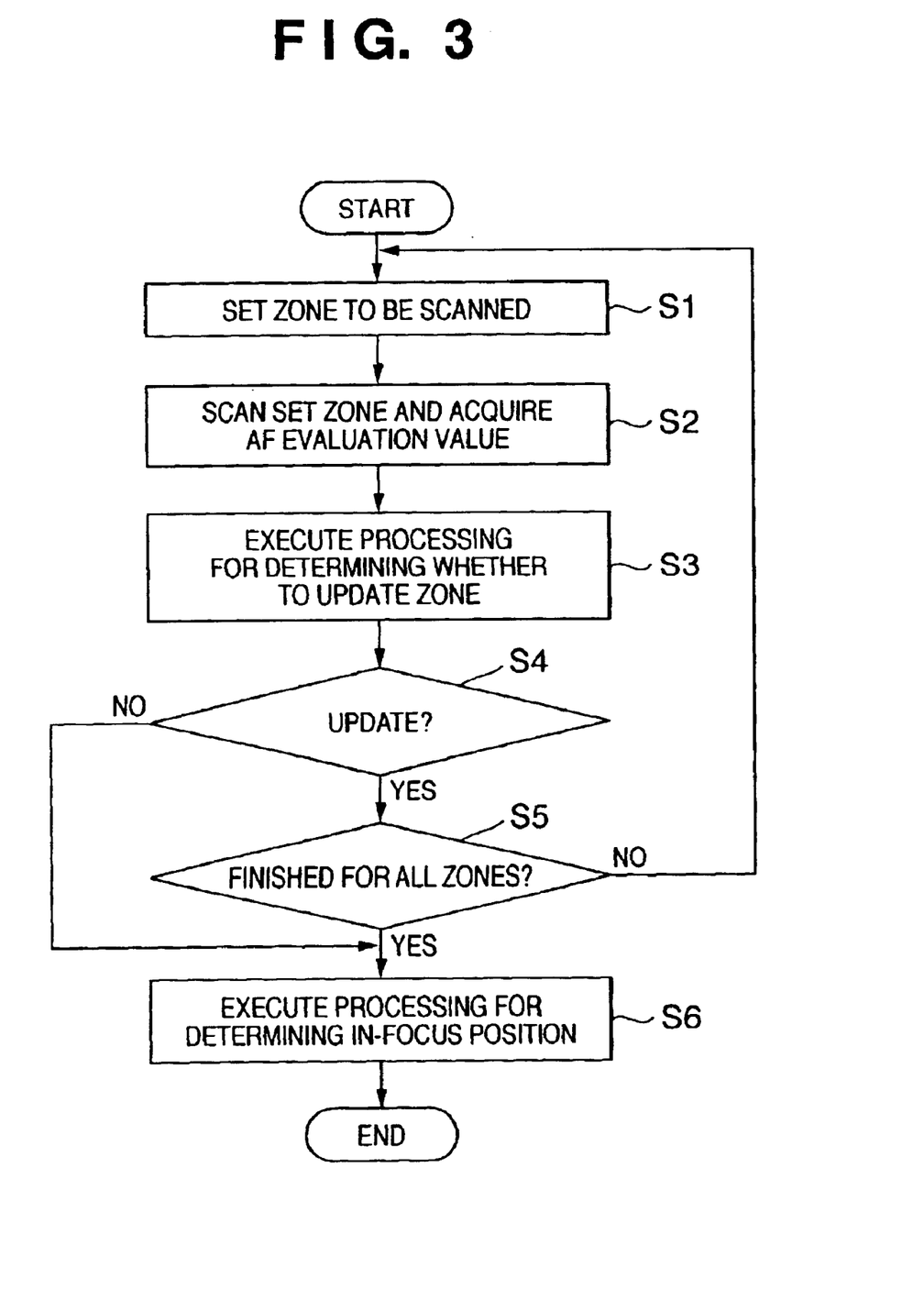
FIG. 3 is a flowchart illustrating an AF operation when a distance measurement zone has been divided.

Next, reference will be had to the flowchart of FIG. 3 to describe the flow of processing up to successive scanning of the distance measurement zones set as described above, acquisition of AF evaluation values and final decision of the in-focus position. The processing illustrated in this flowchart is executed by having the control unit 11 control each component of the digital camera of FIG. 1 based upon a program.

At step S1 in FIG. 3, the distance measurement zone setting means 12 sets the distance measurement zone to be scanned. In a case where the updating order of the distance measurement zones is distance measurement zone 1→distance measurement zone 2→distance measurement zone 3, first the distance measurement zone 1 is set. Next, at step S2, the distance measurement zone that has been set by the distance measurement zone setting means 12 is scanned, whereby an AF evaluation value is acquired by the AF evaluation value calculation circuit 14. The AF evaluation value may be calculated by applying BPF-based filtering processing to the signal obtained by photography, extracting mid- and high-frequency components of this signal and then adopting the maximum value of amplitude within the AF frame as the AF evaluation value. Alternatively, calculation may include extracting the maximum value along the X axis in filtering by the BPF within the AF frame, integrating maximum values along the direction (Y-axis) perpendicular to the direction of the X axis of the BPF, and adopting the integrated value as the AF evaluation value.

Next, at step S3, the zone-update determination means 15 executes zone-update determination processing for determining whether or not to update the distance measurement zone based upon the AF evaluation value acquired by the AF evaluation value calculation circuit 14. Specifically, in zone-update determination processing, whether to update the distance measurement zone or not is determined based upon the difference between maximum and minimum levels of the AF evaluation value and the manner in which the AF evaluation value rises at the end of the distance measurement zone.

The details of processing for determining updating of the distance measurement zone at step S3 will be described based upon the flowchart of FIG. 4. The processing illustrated in this flowchart is executed by having the control unit 11 control each component of the digital camera of FIG. 1 based upon a program.

Figure 4:
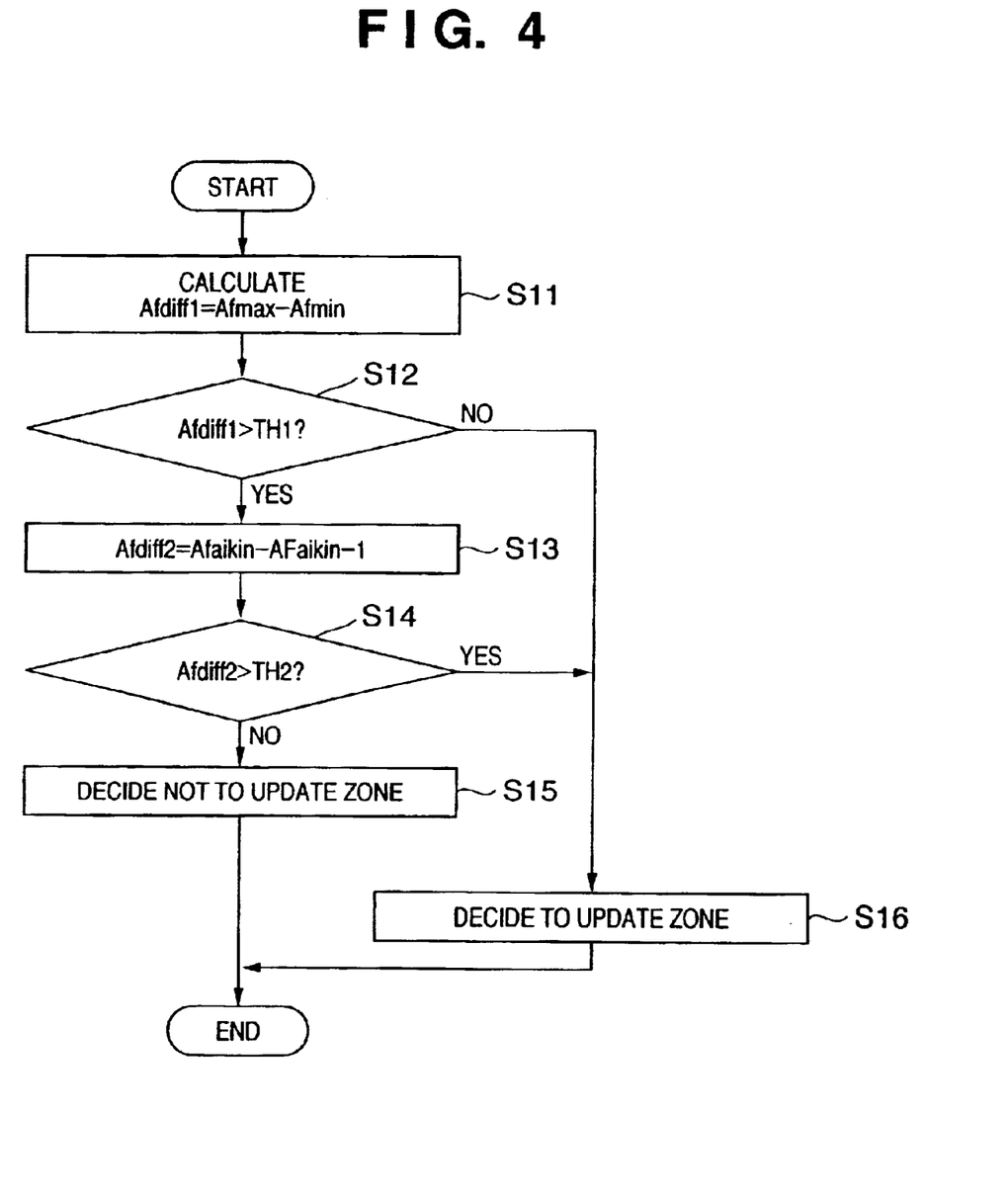
FIG. 4 is a flowchart illustrating processing for determining updating of a distance measurement zone.

At step S11 in FIG. 4, first the zone-update determination means 15 calculates Afdiff 1=Afmax−Afmin, which is the difference between a maximum value Afmax and minimum value Afmin of all AF evaluation values in distance measurement zones scanned thus far. Next, at step S12, the zone-update determination means 15 determines whether the calculated difference Afdiff 1 is greater than a threshold value TH1. If Afdiff 1>threshold value TH1 is found to hold, the zone-update determination means 15 determines that the AF evaluation signal has peaked (i.e., that the peak of the AF evaluation signal has been found) and renders an "OK" decision (i.e., decides that the distance measurement zone is not to be updated). If it is found that Afdiff 1>threshold value TH1 does not hold, the zone-update determination means 15 renders an "NG" decision (i.e., determines that the distance measurement zone is to be updated).

Figure 5:
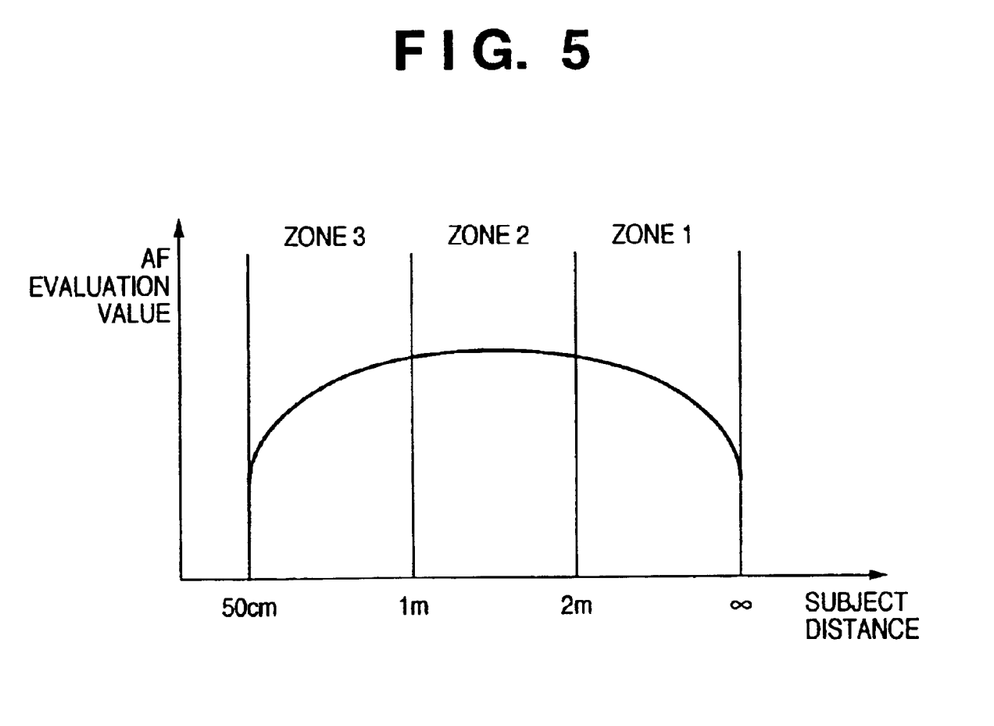
FIG. 5 is a diagram illustrating an example of a relationship between the range of each distance measurement zone and an AF evaluation value.

The manner in which the AF evaluation value rises at the end of a distance measurement zone is for judging whether the AF evaluation value is rising on the very near side in the distance measurement zone 1, as shown for example in FIG. 5. That is, at step S13, the zone-update determination means 15 calculates the difference Afdiff 2=Afsikin−Afsikin−1, which is the difference between the AF evaluation value Afsikin on the nearest side in the distance measurement zone 1 and the immediately preceding AF evaluation value Afsikin-1, and compares the result of calculation with a threshold value TH2 at step S14. If it is found that the result is greater than the threshold value TH2, the zone-update determination means 15 judges that the AF evaluation value at the end of the distance measurement zone is rising and renders the NG decision (the decision to update the distance measurement zone) by reason of the fact that the peak of the AF evaluation signal in FIG. 5 is located in another distance measurement zone. If it is found that the result is equal to less than the threshold value TH2, then the zone-update determination means 15 renders the OK decision (the decision not to update the distance measurement zone).

It should be noted that the threshold value TH1 used in determining updating of the distance measurement zone need not be a fixed value; it may be changed depending upon the number of distance measurement zones scanned thus far. That is, the greater the number of distance measurement zones observed (the greater the number of distance measurement zones into which division is made), the more likely a significant difference between the peak of the AF evaluation signal and the minimum level should manifest itself. If there are a large number of zones, therefore, it possible to adopt a large threshold value. Further, the fewer the distance measurement zones, the more difficult it will be for a difference between the maximum and minimum levels of the AF evaluation value to appear, and hence in this case it is better to adopt a small threshold value. Thus, by changing the requirement for determining updating of the distance measurement zone in dependence upon the zone update history, it is possible to carry out more suitable determination of updating of the distance measurement zone.

Furthermore, the parameter (requirement for determining updating of the distance measurement zone) may be changed in dependence upon the mode of photography. For example, in a case where the S/N ratio of the AF evaluation value can be assumed to be poor because the subject is dark as in a mode for photographing a night scene, it may be arranged so as to make updating of the distance measurement zone as easy as possible and observe (calculate) a subject distance over a wide range.

In a case where the two zone update requirements of steps S12 and S14 both receive "OK" decisions, it is decided not to update the distance measurement zone at step S15. Otherwise, it is decided to update the distance measurement zone at step S16.

With reference again to FIG. 3, it is determined at step S4 whether to update the distance measurement zone using the result of zone update determination processing of FIG. 4. If the zone-update determination means 15 has decided to update the distance measurement zone, then, at step S5, it is determined whether the above-described processing has ended with regard to all of the distance measurement zones. If the zone-update determination means 15 has determined that the distance measurement zone is not to be updated, then control proceeds to step S6, which is processing for determining the in-focus position. If the zone-update determination means 15 has decided to update the distance measurement zone and, moreover, the above-described processing has not ended with regard to all distance measurement zones at step S5, then the next distance measurement zone is set at step S1. If the above-described processing has ended with regard to all distance measurement zones, then control proceeds to step S6, namely processing for determining the in-focus position.

In processing for determining the in-focus position at step S6, first the in-focus position decision means 16 calculates the in-focus position after it has discriminated the in-focus state. Discrimination of the in-focus state involves obtaining Afdiff 1 (=Afmax−Afmin), in a manner similar to that of processing for determining zone update described above, based upon all AF evaluation values of distance measurement zone scanned thus far, and comparing Afdiff 1 with a threshold value TH3. The in-focus position decision means 16 determines that focusing is possible if Afdiff 1>TH3 holds and is impossible if Afdiff 1>TH3 does not hold. If focusing is possible, the maximum value of AF evaluation values is adopted as the in-focus position. It should be noted that the requirement for discriminating the in-focus state can be changed in dependence upon the history of zone update. Further, if it is discriminated that focusing is possible, updating the distance measurement zones is terminated.

By changing the setting of the threshold value TH1 in the processing for determining zone update and the setting of the threshold value TH3 in the processing for determining the in-focus position, it is possible to make the updating of the distance measurement zones easier or more difficult. For example, if the threshold value TH1 is greater than the threshold value TH3, the OK decision (the decision not to update the distance measurement zone) will not be rendered unless the difference between the high and low levels of the AF evaluation signal becomes correspondingly large. As a consequence, updating of the distance measurement zone becomes easier. Further, the determination regarding updating of the distance measurement zone may be made exactly the same as the determination regarding the in-focus state.

Thus, in accordance with the first embodiment, as described above, subject distance is divided into a plurality of distance measurement zones and a distance measurement zone to be scanned is selected. An AF evaluation value is acquired by scanning the selected distance measurement zone and whether the distance measurement zone to be scanned is to be updated or not is determined using the AF evaluation value. The distance measurement zone scanned is updated appropriately and the in-focus position is decided based upon the acquisition of the AF evaluation value. In cases where the subject is found quickly, therefore, it is no longer necessary to scan other distance measurement zones. As a result, focusing time can be shortened correspondingly. Even in this case there is no decline in focusing performance of AF control.

Accordingly, it is possible to realize a focus control apparatus and a digital camera having this apparatus in which autofocus time is shortened by raising autofocus speed without lowering autofocus precision even in a case where there are a large number of samples of AF evaluation signals required with respect to the range of distance measurement.

[Second Embodiment]

Figure 6:
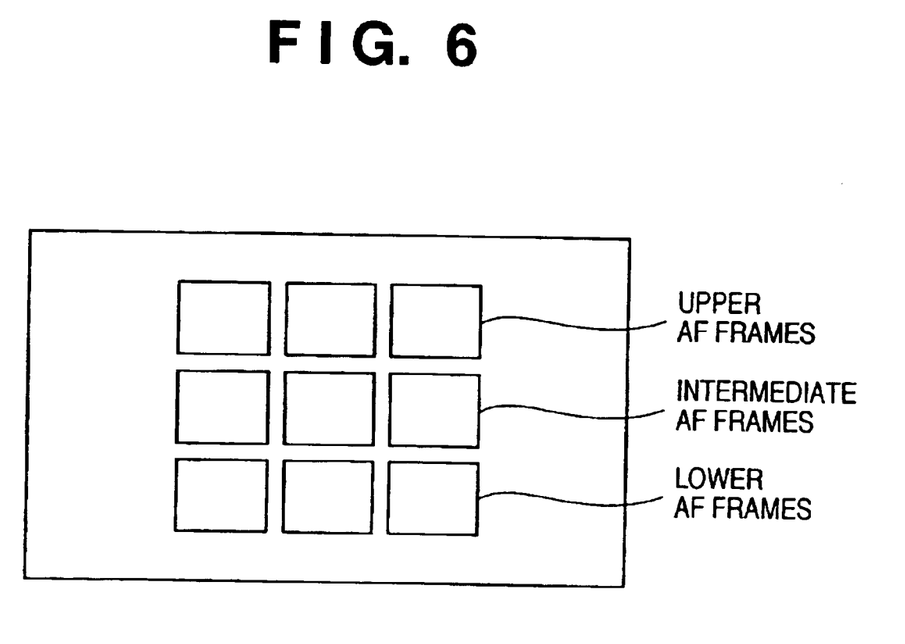
FIG. 6 is a diagram illustrating positions of AF frames in a case where nine AF frames have been set in accordance with a second embodiment of the present invention.

A second embodiment of the present invention will be described for a case where the autofocus apparatus of the present invention is applied to a digital camera and, moreover, there are a plurality of AF frames (distance-measurement positions) on the screen of the digital camera. The second embodiment differs from the first embodiment in that the processing for determining updating of the distance measurement zone is changed owing to the presence of a plurality of AF frames. The second embodiment will be described for a case where there are nine frames, as depicted in FIG. 6. It should be noted that the structure of the digital camera in the second embodiment is the same as that of the first embodiment (see FIG. 1) and need not be described again.

The operation of the digital camera in the second embodiment thus constructed will be described in detail with reference to FIGS. 1, 6 and 7.

The flow of processing of the AF operation in the second embodiment is similar to that of the flowchart of FIG. 3 according to the first embodiment; only the processing of step S3 for determining updating of the distance measurement zone is different. The second embodiment will be described with regard to this processing for determining updating of the distance measurement zone. Further, the order of zone updating is changed so that updating is from far to near.

In addition, the discrimination of the state of the curve of the AF evaluation signal in each AF frame in the second embodiment is similar to that of the flowchart of FIG. 4 according to the first embodiment. In the second embodiment, if a "NO" decision is rendered at step S14, the state of the crest of the AF evaluation signal is expressed by ◯ (this means that the signal has a peak in the particular distance measurement zone); if a "YES" decision is rendered at step S14, the state of the crest is expressed by Δ (this means that the signal has a peak in another distance measurement zone); and if a "NO" decision is rendered at step S12, the state of the crest is expressed by x (this means that the signal has no peak in the particular distance measurement zone).

Next, the flow of the processing for determining zone update will be described with reference to the flowchart of FIG. 7. The processing illustrated in this flowchart is executed by having the control unit 11 control each component of the digital camera of FIG. 1 based upon a program.

Figure 7:
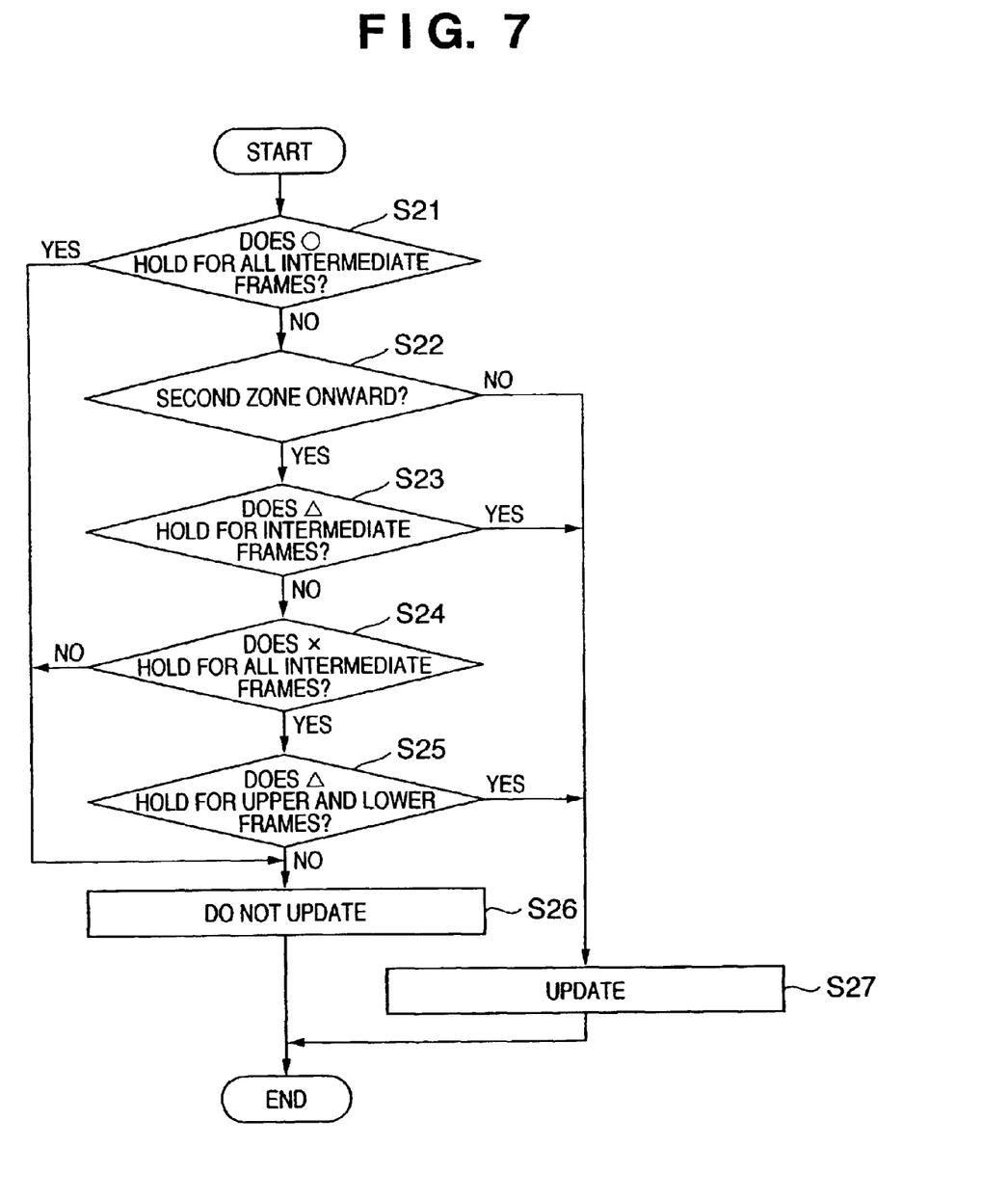
FIG. 7 is a flowchart illustrating processing for determining updating of a distance measurement zone in a case where a plurality of AF frames exist.

At step S21 in FIG. 7, the zone-update determination means 15 investigates the states of the AF evaluation values in the three intermediate AF frames among the nine upper, intermediate and lower AF frames in FIG. 6. Control proceeds to step S26, at which the zone-update determination means 15 determines that the distance measurement zone is not to be updated, only if ◯ is indicated for all three of the intermediate frames. All nine of the upper, intermediate and lower AF frames are not investigated because it is considered here that the intermediate AF frames have priority. This is so that even if a subject at short distance is within an upper or lower AF frame, focus will not be pulled in that direction (e.g., so that the main subject will not be brought into focus in an upper or lower AF frame in a case where the main subject is located in an intermediate AF frame). Further, the reason for investigating the three intermediate AF frames rather than a single center point is to prevent erroneous distance measurement in autofocus in case of a scene where the center is empty, as when the main subject is not centrally located.

If a "NO" decision is rendered at step S21 (i.e., if not all of the intermediate frames are ◯), then, at step S22, the zone-update determination means 15 determines whether updating of the distance measurement zone is from the second onward. If updating of the distance measurement zone is the from the second onward, then the zone-update determination means 15 determines at step S27 that the distance measurement zone is to be updated. The reason for determining whether updating of the distance measurement zone is from the second onward is as follows: If the subject distance is divided into the distance measurement zones finely, there is a possibility that only the base of the crest of the AF evaluation signal will be scanned. Hence, the determination concerning updating of the distance measurement zones is carried out after investigating a plurality of distance measurement zones as much possible so as to avoid an "x" determination from being made owing to observation solely of the base of a crest despite the fact that the signal actually has a peak.

If a "YES" decision is rendered at step S22 (i.e., if updating of the distance measurement zone is from the second onward), then, at step S23, the zone-update determination means 15 investigates the state of the AF evaluation value in the intermediate AF frames and checks to see whether "Δ" holds for the intermediate frames. If "Δ" holds for the intermediate frames, then the zone-update determination means 15 interprets this as meaning that the peak of the AF evaluation signal is still in another distance measurement zone and determines at step S27 that the distance measurement zone is to be updated. If "Δ" does not hold for the intermediate frames, then, at step S24, the zone-update determination means 15 investigates the state of the AF evaluation value in the intermediate AF frames and checks to see whether "x" is indicated for all of the intermediate frames.

If not all of the intermediate frames indicate "x" ("NO" at step S24), this means that "◯" holds for any of these frames and the zone-update determination means 15 determines at step S27 that the distance measurement zone is to be updated. If "Δ" does not hold for the upper and lower frames ("NO" at step S25), then the zone-update determination means 15 determines at step S26 that the distance measurement zone is not to be updated.

This embodiment illustrates an example of processing for determining zone updating in a case where there are a plurality of AF frames. However, the present invention is not limited to this example and the determination concerning updating of the zones may be performed using all of the AF frames at all times. In addition, priority need not be given to the intermediate AF frames among the plurality of AF frames.

Thus, in accordance with the second embodiment, as described above, even if there are a plurality of AF frames, subject distance is divided into a plurality of distance measurement zones and an AF evaluation value is acquired by scanning the selected distance measurement zone. Scanning can be halted when it is determined, based upon the AF evaluation value, that the in-focus state has been obtained. As a result, it is possible to realize a focus control apparatus and a digital camera having this apparatus in which AF control time is shortened by raising AF speed.

[Third Embodiment]

A third embodiment of the present invention will be described for a case where the autofocus apparatus of the present invention is applied to a digital camera equipped with a focusing lens in addition to a zoom lens. The third embodiment differs from the first embodiment in that the optical system of the camera has a zoom lens. Structural elements of the digital camera other than the zoom lines in the third embodiment are similar to those of the first embodiment (see FIG. 1) and need not be described again.

The operation of the digital camera in the third embodiment thus constructed will be described in detail with reference to FIGS. 1, 8 and 9A, 9B.

Figure 8:
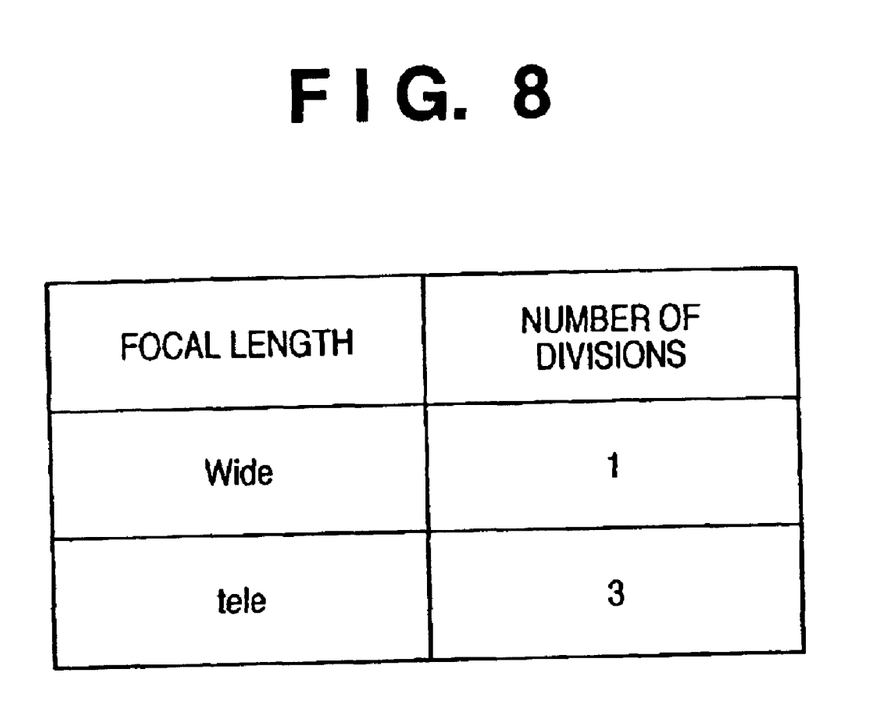
FIG. 8 is a diagram illustrating an example of a relationship between focal length and number of divisions of distance measurement zones according to a third embodiment of the present invention.

The number of scanning points associated with AF time is decided by the amount of movement of the focusing lens 2 necessary to scan the range if distance measurement and how finely the range of distance measurement is scanned. In general, the amount of movement of the focusing lens 2 increases when focal length increases. On the other hand, how finely the range of distance measurement is scanned is decided depending upon Fδ, which corresponds to focal depth (where F represents the F-number and δ the allowable diameter of circle of confusion). If the F-number does not change due to focal length, the amount of movement of the focusing lens 2 increases when the focal length increases and therefore AF time is prolonged by an amount corresponding to the increase. Accordingly, it is preferred that the number of distance measurement zones into which division is made be optimized depending upon each focal length, as shown in FIG. 8.

Figure 9A:
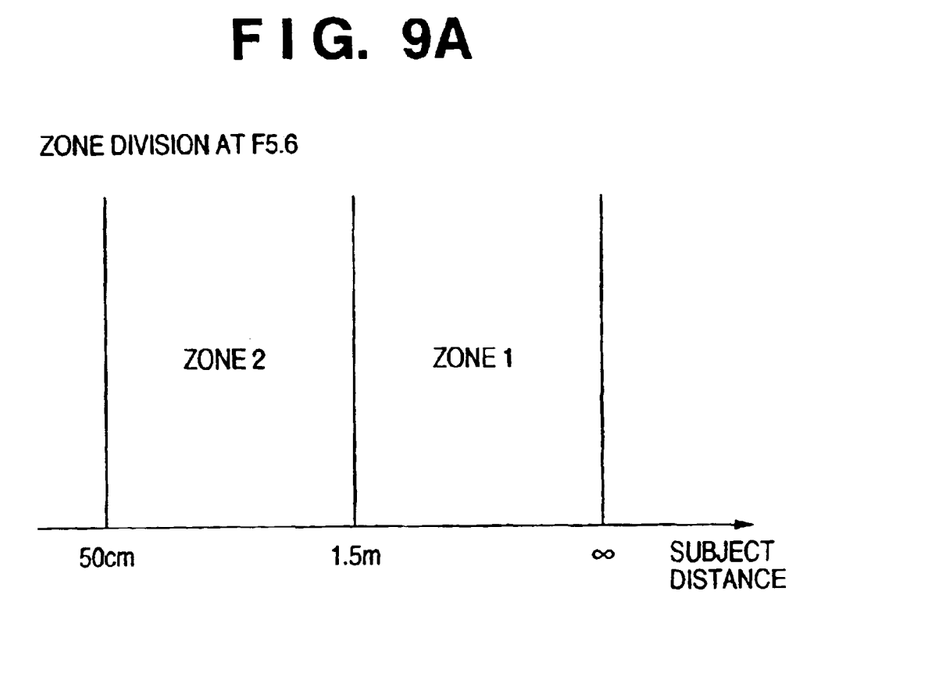
Figure 9B:
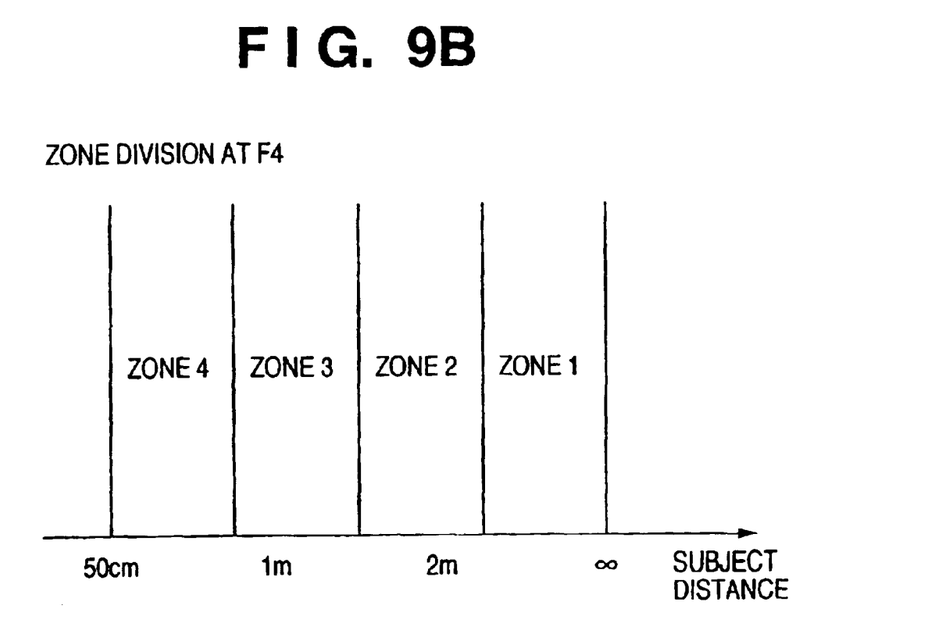

Further, in a case where the fineness of scanning has been changed in accordance with a change in F-number, the manner of division into distance measurement zones may be changed depending upon the F-number. For example, in case of a digital camera having two F-numbers of F4 and F5.6, an instance where a picture is taken at F5.6 will have a greater focal depth in comparison with an instance where a picture is taken at F4. An AF evaluation value therefore may be acquired more coarsely. More specifically, if the amount of movement of the focusing lens 2 is set to be twice as large at the time of F5.6 photography as the amount of movement of the focusing lens 2 within the scanning points at the time of F4 photography, then the number of scanning points in regard to the full area of the range of distance measurement is approximately half of that at the time of F5.6 photography. Accordingly, if the number of scanning points every distance measurement zone is set to be constant at all times, the number of distance measurement zones into which division is made at the time of photography at F4 will be twice that at the time of photography at F5.6, as illustrated in FIGS. 9A, 9B.

The embodiment has been described with regard to the number of distance measurement zones into which division is made. However, a change may be made in regard to the order of zone update depending upon the conditions of photography. For example, in a case where luminance level is high at the time of photography, it is judged that photography is being performed outdoors and, taking the approach that a subject in the distance should be given priority, scanning is performed from a far distance measurement zone to a near distance measurement zone. Further, in a case where luminance level is low at the time of photography, it is judged that photography is being performed indoors and, taking the approach that a subject in nearby should be given priority, scanning is performed from a near distance measurement zone to a far distance measurement zone.

Further, the order of zone update may be changed depending upon the mode of photography. For example, if the camera has been set to a mode for shooting scenery, it will suffice to perform scanning giving priority to a far distance measurement zone. If the camera has been set to a mode for shooting a portrait, then scanning would be performed giving priority to a short distance or to a distance measurement zone in which a person is often present. Further, if a flash photography mode has been set, portrait photography would be decided and it would suffice to perform scanning giving priority to a short distance or to a distance measurement zone in which a person is often present.

Thus, in accordance with the third embodiment, as described above, by changing the number of distance measurement zones into which division is made, the number of scanning points or the order in which distance measurement zones are updated in accordance with focal length or f-stop at the time of photography, it is possible to realize an autofocus apparatus and a digital camera having this apparatus that shorten AF time by raising AF speed.

[Other Embodiments]

It goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention.

Examples of storage media that can be used for supplying the program code are a floppy disk (registered trademark), hard disk, optical disk, magneto-optical disk, CD-ROM, CD-R, CD-RW, DVD-ROM, DVD-RAM, DVD-RW, DVD+RW, magnetic tape, non-volatile memory card and ROM, etc.

Furthermore, besides the case where the aforesaid functions according to the embodiments are implemented by executing the program code read out by computer, an operating system or the like running on the computer may perform all or a part of the actual processing based upon the commands of the program code so that the functions of the foregoing embodiments are implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing based upon the commands of the program code so that the functions of the foregoing embodiments can be implemented by this processing.

The present invention is not limited to the above embodiments and various changes and modifications can be made within the spirit and scope of the present invention. Therefore, to apprise the public of the scope of the present invention, the following claims are made.

What is claimed is:

1. A focus control apparatus for detecting in-focus position of a focusing optical system by performing scanning for driving the focusing optical system in accordance with a prescribed range of a subject distance, comprising:
   zone dividing means for dividing the subject distance into a plurality of distance measurement zones;
   zone selection means for selecting a distance measurement zone to be scanned;
   in-focus state acquisition means for acquiring distance-measurement information by scanning the selected distance measurement zone;
   zone-update determination means for determining, through use of the in-focus state, whether or not to update a distance measurement zone to be scanned; and
   in-focus position decision means for deciding an in-focus position of the focusing optical system based upon result of the determination as to whether to update the distance measurement zone.

2. The apparatus according to claim 1, wherein said zone-update determination means determines whether a distance measurement zone is to be updated, using each in-focus state of the distance measurement zone scanned.

3. The apparatus according to claim 1, wherein said zone-update determination means changes a requirement for determining whether or not to update a distance measurement zone in dependence upon update history of the distance measurement zone scanned.

4. The apparatus according to claim 1, wherein application is to a case where a screen has a plurality of distance measurement positions, said zone-update determination means determining whether a distance measurement zone is to be updated, using at least some of the plurality of distance measurement positions.

5. The apparatus according to claim 1, wherein said zone-update determination means includes:
   in-focus discrimination means for discriminating whether or not focus has been achieved using the in-focus state; and
   zone updating means for successively updating the distance measurement zone to be scanned;
   whether or not to execute updating of the distance measurement zone being determined in dependence upon result of in-focus discrimination.

6. The apparatus according to claim 5, wherein said update determination means halts updating of the distance measurement zone if an in-focus state has been discriminated by said in-focus discrimination means.

7. The apparatus according to claim 5, wherein said in-focus discrimination means discriminates the in-focus state using each in-focus state of the distance measurement zone scanned.

8. The apparatus according to claim 5, wherein said in-focus discrimination means changes a requirement for judging the in-focus state in dependence upon update history of the distance measurement zone scanned.

9. The apparatus according to claim 5, wherein application is to a case where a screen has a plurality of distance measurement positions, said zone update determination means determining whether a distance measurement zone is to be updated, using at least some of the plurality of distance measurement positions.

10. The apparatus according to claim 1, wherein order in which distance measurement zones are updated is changed in accordance with mode of photography.

11. The apparatus according to claim 1, wherein a requirement for determining whether or not to update a distance measurement zone is changed in accordance mode of photography.

12. The apparatus according to claim 1, wherein a method of dividing subject distance into the distance measurement zones is changed in accordance with conditions of photography.

13. The apparatus according to claim 12, wherein number of distance measurement zones into which the subject distance is divided is changed in accordance with focal length at time of photography.

14. The apparatus according to claim 13, wherein the greater the focal length at the time of photography, the larger the number of distance measurement zones into which the subject distance is divided is made.

15. The apparatus according to claim 12, wherein number of distance measurement zones into which the subject distance is divided is changed in accordance with f-stop value at time of photography.

16. The apparatus according to claim 15, wherein the more an aperture is stopped down, the smaller the number of distance measurement zones is made.

17. The apparatus according to claim 1, wherein order in which distance measurement zones are updated is changed in accordance with conditions of photography.

18. The apparatus according to claim 17, wherein order in which the distance measurement zones are updated is changed in accordance with luminance level at time of photography.

19. The apparatus according to claim 17, wherein order in which the distance measurement zones are updated is set giving priority to long distances in a scenery photography mode.

20. The apparatus according to claim 17, wherein order in which the distance measurement zones are updated is set giving priority to short distances in a portrait photography mode.

21. The apparatus according to claim 17, wherein order in which the distance measurement zones are updated is set giving priority to short distances in a flash photography mode.

22. The apparatus according to claim 1, wherein the in-focus state is an autofocus evaluation value obtained by extracting a prescribed signal component from a signal that has been acquired by an image sensing device.

23. An image sensor having an in-focus control apparatus set forth in claim 1.

24. A program for controlling an in-focus control apparatus so as to detect in-focus position of a focusing optical system by performing scanning for driving the focusing optical system in accordance with a prescribed range of a subject distance, said program causing a computer to function as:
   means for dividing the subject distance into a plurality of distance measurement zones;
   means for selecting a distance measurement zone to be scanned;
   means for acquiring the in-focus state of the focusing optical system by scanning the selected distance measurement zone;

means for determining, through use of the in-focus state, whether or not to update a distance measurement zone to be scanned; and means for deciding an in-focus position of the focusing optical system based upon result of the determination as to whether to update the distance measurement zone.

25. A computer-readable storage medium storing a program for controlling an in-focus control apparatus so as to detect in-focus position of a focusing optical system by performing scanning for driving the focusing optical system in accordance with a prescribed range of a subject distance, said storage medium storing a program for a computer to function as:

means for dividing the subject distance into a plurality of distance measurement zones;

means for selecting a distance measurement zone to be scanned;

means for acquiring the in-focus state of the focusing optical system by scanning the selected distance measurement zone;

means for determining, through use of the in-focus state, whether or not to update a distance measurement zone to be scanned; and means for deciding an in-focus position of the focusing optical system based upon result of the determination as to whether to update the distance measurement zone.

* * * * *